Jan. 26, 1932.  E. DICKEY  1,842,509
ELECTRICAL APPARATUS
Filed April 26, 1929
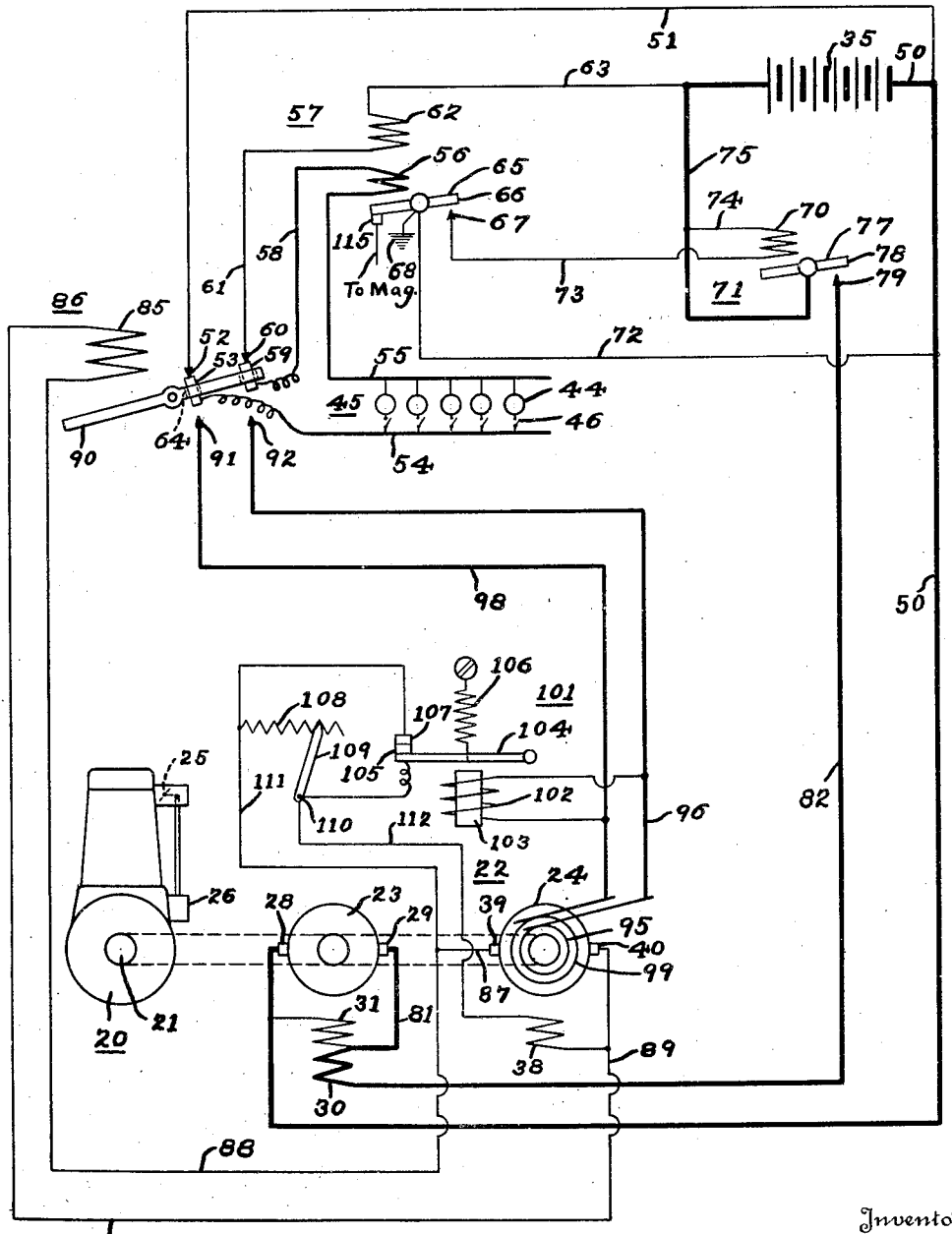
Inventor
Ernest Dickey
By Spencer, Hardman, and Fehr
Attorney Patented Jan. 26, 1932

1,842,509

UNITED STATES PATENT OFFICE

ERNEST DICKEY, OF DAYTON, OHIO, ASSIGNOR TO DELCO-LIGHT COMPANY, OF DAYTON, OHIO, A CORPORATION OF DELAWARE

ELECTRICAL APPARATUS

Application filed April 26, 1929. Serial No. 358,318.

This invention relates to automatic house lighting systems and particularly to systems for supplying alternating current.

One of the objects of the present invention is to provide a generating system for supplying relatively high voltage alternating current and to provide for the starting of such system through a relatively low voltage source of direct current. One manner of carrying out this object is to provide a system including a low voltage storage battery and an electrical apparatus which, when connected with the low voltage battery, will operate as a direct current motor for rendering a prime mover operable and which will function as a relatively high voltage alternating current generator when driven by the prime mover, after the prime mover becomes self operative.

Another object of this invention is to provide for maintaining the low voltage battery in a charged condition.

Further objects and advantages of the present invention will be apparent from the following description, reference being had to the accompanying drawing, wherein a preferred form of the invention is clearly shown.

In the drawing:

The figure in the drawing is a wiring diagram illustrating the present invention.

Referring to the drawing 20 designates generally a prime mover herein shown, for the purpose of illustration, as an internal combustion engine having a shaft 21 which drives an electrical apparatus 22 which is herein shown as comprising two units, namely, a starting-generating-dynamo unit 23 and a generator unit 24 used primarily for supplying alternating current.

A throttle 25 for regulating the speed of the prime mover 20 is adapted to be controlled by a governor 26.

The starting-generating-dynamo 23 is provided with main brushes 28 and 29 connected with the armature, and includes a series field winding 30 and a shunt field winding 31. The unit 23 functions as a motor or as a generator, and is adapted to rotate the shaft 21 of the prime mover 20, when acting as a starting motor, receiving current from a storage battery 35. During the starting of the prime mover 20, the current through the series winding 30 and through the shunt winding 31 is cumulative to produce a sufficient starting torque for cranking the prime mover. When acting as a generator, the current through the series winding 30 is reversed, from that during cranking operation, thereby opposing the shunt winding 31. During generating operation, and when the series winding 30 is opposing the shunt winding 31, the starting-generating-dynamo 23 functions to supply a charging current of a proper value to the storage battery 35.

The unit 24 includes a shunt field winding 38 and main brushes 39 and 40. The unit 24 is adapted to be driven by the shaft 21 of the prime mover 20 for supplying alternating current to translating devices or lights 44 in the work circuit or service line 45 after the prime mover 20 becomes self operative.

To start the engine automatically in response to a demand for current by the work circuit, one of the switches 46 in the work circuit is closed, causing current to flow from the battery through the following circuit, the switches and relays being in the position shown: battery 35, wires 50 and 51, contacts 52 and 53, service main 54, switch 46, translating device 44, service main 55, series winding 56 of a starting switch relay 57, wire 58, contacts 59 and 60, wire 61, shunt winding 62 of the starting switch relay 57 and wire 63 to the other side of the battery. The energizing of the windings 56 and 62 will cause the upward movement of an armature 65, which armature forms a part of the starting switch relay 57, to engage a movable contact 66, carried by the armature 65 with a stationary contact 67. The upward movement of the armature 65 will also disconnect a ground 68 from the magneto (not shown), thereby conditioning the magneto for operation.

The closing of contacts 66 and 67 causes a circuit to be completed through a magnet coil 70 of a starting switch 71. The circuit from the battery 35 through the magnet coil 70 is as follows: battery 35, wires 50 and 72, contacts 66 and 67, wire 73, coil 70, wires 74, 75 and 63 to the other side of the battery. The energizing of magnet coil 70 causes an armature 77, which forms a part of the starting switch 71, to be moved upwardly to cause a movable contact 78, carried by the armature 77, to engage a contact 79.

The closing of contacts 78 and 79 establishes a cranking circuit between the storage battery 35 and the starting-generating-dynamo unit 23. The circuit from the battery through the unit 23 is as follows: battery 35, wire 50, unit 23, wire 81, series winding 30 of unit 23, wire 82, contacts 79 and 78, wires 75 and 63 to the other side of the battery.

When the prime mover 20 become self operative and the speed attains a certain value, the generator unit 24 driven thereby will cause a magnet coil 85 of a control switch 86 to be energized by direct current from the generator 24. The circuit from the generator 24 through the magnet coil 85 is as follows: generator 24, brush 39, wires 87 and 88, coil 85, wire 89 to brush 40 on the other side of generator. The energizing of this coil will cause the upward movement of an armature 90 forming a part of the switch 86. The armature 90 carries the contacts 53 and 59 inserted in suitable nonconducting bushings 64. The upward movement of the armature 90 will cause the separation of contacts 52 and 53 and the separation of contacts 59 and 60, and in turn cause the contact 53 to engage a contact 91 and cause the contact 59 to engage a contact 92. In actual practice the coils 56 and 62, of switch 57, are wound around a metal core (not shown), likewise the coil 85 of switch 86 is wound around a metal core (not shown). Thus when there is a demand for current by the work circuit, the core of switch 57 will be magnetized by the coils 56 and 62 to draw the armature 65 upwardly to engage the contact 66 with the contact 67 and to condition the magneto for operation. When the prime mover becomes self-operative, the generator 24 will energize the coil 85 to magnetize the core of switch 86 to suddenly snap the armature 90 upwardly. When this occurs, the contacts 52—53 and contacts 59—60 will be suddenly separated, and the contacts 53—59 will suddenly engage contacts 91—92 respectively. During this brief instance the residual magnetism in the core of switch 57 will maintain the armature 65 in its upper position to thus maintain the magneto in operative position and to maintain the contacts 66—67 closed. Since the contacts 53—91 and contacts 59—92 are closed, the high voltage generator 24 energizes the coil 56 sufficiently to maintain the magneto operative to maintain the switch 57 closed.

When contacts 52 and 53, 59 and 60 become separated, the circuit from the battery 35 through the work circuit 45 and through the shunt winding 62 of the starting switch relay 57 will be interrupted, the contacts 66 and 67 then being controlled entirely by the winding 56 of the relay 57.

The closing of contacts 53 and 91, and contacts 59 and 92 will complete a circuit between the work circuit 45 and the unit 24 to supply alternating current to the translating devices in the work circuit 45. The current from the unit 24 through the work circuit 45 is as follows: collector or slip ring 95, wire 96, contacts 92 and 59, wire 58, series winding 56 of starting switch relay 57, service main 55, translating device 44, switch 46, service main 54, contacts 53 and 91, wire 98 and collection ring 99.

In the event that the output of the generator 24, during its operation, should attain an abnormal high value, a voltage limiting device 101 is adapted to place a resistance in series with the shunt winding 38 of the generator 24, thereby maintaining a substantially constant voltage and preventing an excessive amount of current from being impressed across the work circuit 45. The voltage limiting device 101 includes a magnet coil 102 having its ends connected across the generator, a magnet core 103, a pivoted armature 104, which carries a contact 105, said admature being urged upwardly by a spring 106 to engage contact 105 with a contact 107. The device 101 also includes the resistance 108 and a blade 109 which is pivoted at 110. Under normal operation of the generator 24, the circuit from this generator through the device 101 is as follows: brush 39, wire 87, wire 111, contacts 107 and 105, wire 112, shunt field winding 38 of the generator 24 and wire 89 to the brush 40 on the other side of the generator. In the event that the voltage output of the generator 24 attains a predetermined high value, the magnet coil 102 will magnetize the core 103 sufficiently to draw the armature 104 downwardly to separate contacts 105 and 107, thereby placing the resistance 108 in series with the shunt field winding 38 of the generator 24. The circuit through the shunt field then is as follows: brush 39, wire 87, wire 111, resistance 108, blade 109, wire 112, shunt winding 38, and wire 89 to the brush 40 on the other side of the generator. When it is desired to increase or decrease the effectiveness of the shunt field the blade 109 may be moved either to the right or to the left to increase or decrease the amount of resistance through which the current must pass.

The ampere turns of coil 85 are sufficient to actuate the switch 86 and to maintain contacts 53—91 and contacts 59—92 closed during operation of the prime mover, the device 101 serving merely to maintain a substantially constant voltage and preventing an excessive amount of current from being impressed across the work circuit.

In order to render the system inoperative it is necessary that all the switches 46 in the work circuit 45 be open. This interrupts the flow of current through the series winding 56 of the starting switch relay 57. When the winding 56 is deenergized, the armature 65 will descend by gravity to engage a contact 115. The contact has a wire 116 secured thereto which leads to the magneto. As the armature 65 engages the contact 115 the magneto will be grounded at 68, thereby stopping the prime mover 20.

For the sake of simple illustration I have shown the electrical apparatus as consisting of two units, namely, a starting-generating-dynamo 23 and an alternating current generator 24. It is to be understood, however, that the two units comprising the electrical apparatus may be combined in one unit.

From the foregoing it will be readily seen that I have provided a generating system for house lighting purposes and the like which will supply alternating current and I have arranged for the ready starting of the system in a simple and inexpensive manner. The system may be rendered operable by the use of a relatively low voltage storage battery which is inexpensive. I have also arranged for the charging of the battery. After the system becomes operative to supply the work circuit with relatively high voltage alternating current, it also provides for maintaining the storage battery in a charged condition by supplying it with direct current of a proper value. Another advantage of using a low voltage battery for rendering the system operable, is that it avoids the use of large or numerous batteries, thus the cost and upkeep of the system will be reduced to a minimum.

While the form of embodiment of the invention as herein disclosed, constitutes a preferred form, it is to be understood that other forms might be adopted, all coming within the scope of the claim which follows.

What is claimed is as follows:

An electrical generating system comprising, in combination, a prime mover; a storage battery; service mains; electrical apparatus including a motor unit for rendering the prime mover operable, said apparatus including a generator unit adapted to be driven by the prime mover, said generator unit having an alternating current circuit for the service mains and having a direct current circuit; a switch for controlling the flow of alternating current to a translating device connected with said mains; a circuit including a portion of the service mains and battery adapted to be closed by said switch, means responsive to the flow of current in said circuit for connecting the battery and motor unit for rendering the prime mover operable; and means responsive to the flow of direct current in the second named circuit for interrupting the flow of direct current in the service mains and for connecting the first named circuit with the service mains.

In testimony whereof I hereto affix my signature.

ERNEST DICKEY.